United States Patent [19]

Utsumi

[11] Patent Number: 4,506,149

[45] Date of Patent: Mar. 19, 1985

[54] TRACKING SERVO SIGNAL GENERATING DEVICE IN AN APPARATUS FOR READING RECORDED INFORMATION

[75] Inventor: Yoshihiro Utsumi, Tokorozawa, Japan

[73] Assignee: Pioneer Electronic Corporation, Tokyo, Japan

[21] Appl. No.: 436,792

[22] Filed: Oct. 26, 1982

[30] Foreign Application Priority Data

Oct. 27, 1981 [JP] Japan ................. 56-171881

[51] Int. Cl.$^3$ .............................. G05B 1/00
[52] U.S. Cl. ...................... 250/202; 369/44
[58] Field of Search .................. 369/44, 45, 46; 250/201 DF, 202

[56] References Cited

U.S. PATENT DOCUMENTS 4,340,950 7/1982 Kosaka ................. 250/202
4,365,323 12/1982 Heemskerk et al. ......... 250/202
4,467,462 8/1984 Shibata ................. 369/44

Primary Examiner—David C. Nelms
Assistant Examiner—J. Jon Brophy

Attorney, Agent, or Firm—Fleit, Jacobson, Cohn & Price

[57] ABSTRACT

A tracking servo signal generating device in a tracking servo control system in a recorded information reading apparatus adapted to deviate an information detecting point in the direction perpendicular to a target recording track on a recording medium in accordance with the tracking servo signal so that the information detecting point accurately traces the recording track, which comprises detecting means for producing a pair of detection signals a difference between which represents amount and/or direction of deviations of the information detecting point from the recording track in the direction perpendicular to the track. The pair of detection signals is processed to produce a first difference between low frequency components of the detection signals and a second difference between envelope components of high frequency components of the detection signals. The first and second differences are mixed to produce the required tracking servo signal, thereby to suppress erroneous components in the resulted tracking servo signal caused by optical and/or mechanical distortions in the recorded information reading apparatus and/or in the recording medium per se.

2 Claims, 16 Drawing Figures

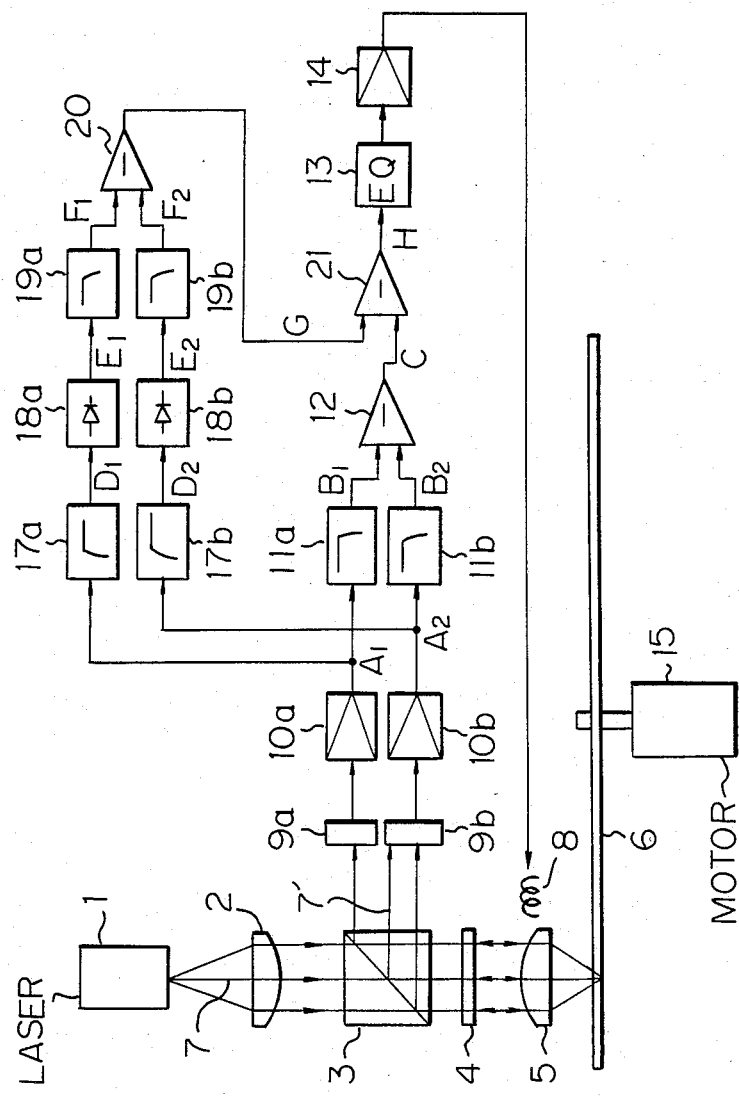

TRACKING SERVO SIGNAL GENERATING DEVICE IN AN APPARATUS FOR READING RECORDED INFORMATION

BACKGROUND OF THE INVENTION

The present invention relates to an aparutus for generating a tracking servo signal in an apparatus for reading recorded information.

There has been known a tracking servo control unit in an apparatus for optically reading recorded information which apparatus has such a construction, for example, as shown in FIG. 1. That is, the light beam radiated from a laser light source 1 enters a recording surface on a recording disc 6 carrying information through a lens 2, beam splitter 3, ¼-wave length plate 4, and object lens 5. The laser light is converged by the object lens 5 to be a pickup light spot as a minute information detecting point on the recording surface. The light reflected by or passed through this disc 6 is separated by the beam splitter 3 and irradiated onto the respective light receiving surfaces of a pair of photoelectric conversion elements 9a and 9b. The out-puts of both photoelectric conversion elements 9a and 9b are applied to a differential amplifier 12 through amplifiers 10a and 10b and LPFs (low-pass filters) 11a and 11b, respectively. This differential output is input to a driving amplifier 14 through an equalizer 13 to be a driving signal for a driving coil 8 for moving the object lens 5 in the direction perpendicular to the track.

The pair of photoelectric conversion elements 9a and 9b are attached so that the receiving surface forms such a dividing line 9c as shown in FIG. 2. The dividing line 9c is in parallel to the tangential direction of the recording track (indicated by an arrow Y) and is disposed so that these elements 9a and 9b are symmetrical with respect to a light axis 7' of the reflected light of the light spot. A reference numeral 7 is a light axis of the incident light, and a reference numeral 15 indicates a spindle motor for rotating the disc 6.

When, with such a construction mentioned above, the center of the pickup light spot deviates in the direction perpendicular to the track from the center of the recording track, the strength distribution of the light entering the photo detectors 9a and 9b becomes asymmetrical depending upon this deviation, resulting in the difference between the outputs of both detectors. Therefore, by obtaining the difference of low-frequency components between the output signals from both these detectors by the differential amplifier 12, a tracking error signal is obtained. By moving the object lens 5 in dependence on this error signal in the direction perpendicular to the track (in the direction of a radius of the disc), the light spot for picking up is deflected thereby to perform the precise tracking operation.

However, such prior art apparatus as mentioned above has a defect in which due to the inclination of the recording surface of the disc 6, deviation of the object lens 5 in the radius direction of the disc due to disturbances, or the like, the center of the reflected light 16 from the disc on the light receiving surfaces of the detectors 9a and 9b deviates from the dividing line 9c as indicated by a broken line in FIG. 2, even when the pickup light spot is aligned on a target track, which causes a critical constant deviation of the light spot from a target track in the tracking servo control system.

SUMMARY OF THE INVENTION

It is therefore an object of the invention to provide an apparatus for generating a tracking servo signal which enables the precise tracking control without any adverse influence to the tracking error signal due to disturbance factors.

In accordance with the present invention, a device for generating a tracking servo signal in an apparatus for reading recorded information is characterized by detecting means for producing a pair output signals a difference between which represents amount and direction of deviations of an information detecting point in the direction perpendicular to a target track, means for obtaining a first difference of low-frequency components of the output signals of the detecting means; means for obtaining a second difference of envelope components of high-frequency components of the output signals of said detecting means; and means for producing said tracking servo signal by mixing said first and second differences.

BRIEF DESCRIPTION OF THE DRAWINGS

The invention will be better understood from the following description with reference to the accompanying drawings, in which:

FIG. 3 is a block diagram of an embodiment of the present invention; and

FIGS. 4A, 4B, 4C, 4D, 4E, 4F, 4G, 4H, 4I, 4J, 4K, 4L, and 4M show operating waveforms in each section of the blocks of FIG. 3.

DESCRIPTION OF THE PREFERRED EMBODIMENT

Figure 1:
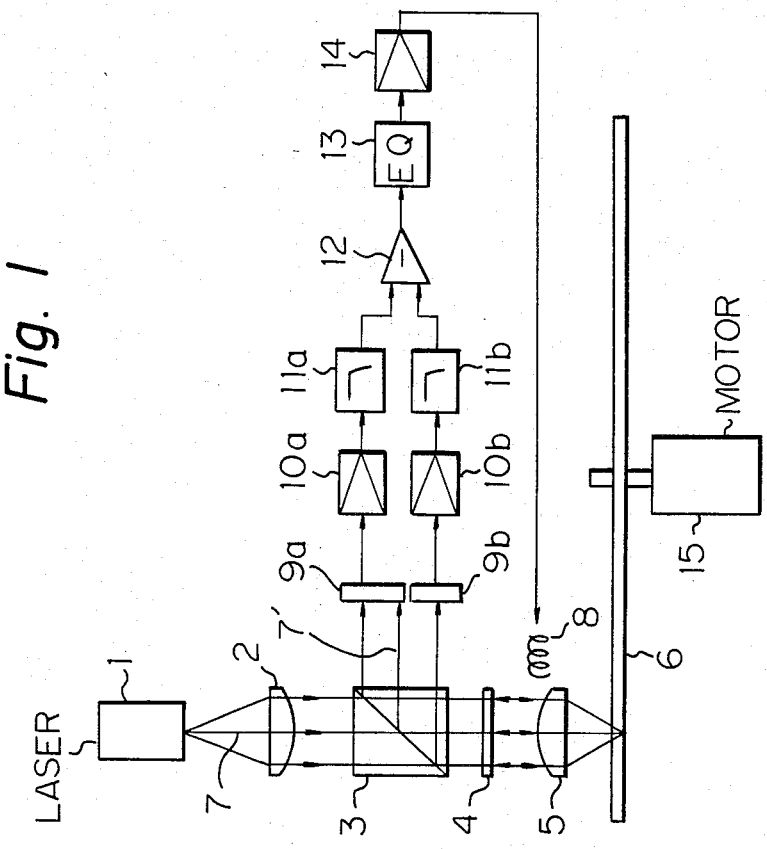
FIG. 1 is a block diagram of a tracking servo apparatus of the prior art.

FIG. 3 is a block diagram of an embodiment of the invention, in which the same or corresponding components in FIG. 1 have been indicated by the same reference numerals. In this embodiment, in addition to the construction of FIG. 1, there has been further provided a circuit for detecting a difference of envelope components of high-frequency components of each output of the photo detectors 9a and 9b. That is to say, high-frequency components $D_1$ and $D_2$ of each output $A_1$ and $A_2$ of the amplifiers 10a and 10b are extracted by HPFs (high-pass filters) 17a and 17b, these components $D_1$ and $D_2$ are rectified by full-wave rectifiers 18a and 18b to obtain rectified waves $E_1$ and $E_2$. These outputs $E_1$ and $E_2$ are input to LPFs 19a and 19b then low-frequency components are extracted to obtain envelope components $F_1$ and $F_2$. Then, a differential component G of these envelope components $F_1$ and $F_2$ is obtained by a differential amplifier 20.

Figure 2:
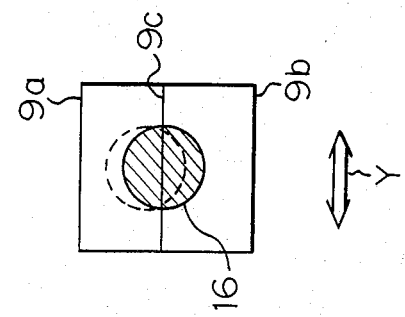
FIG. 2 illustrates a relationship between a photoelectric conversion element and a light spot.

A difference between a differential component C obtained from low-frequency components $B_1$ and $B_2$ of the outputs detected by each of the detectors 9a and 9b by using the differential amplifier 12 and a differential component G of the afore-mentioned envelope components is obtained by a differential amplifier 21. This difference thus obtained is applied to the equalizer 13 and driving amplifier 14, and further to the coil 8. The other constructions are equal to those described previously with respect to FIGS. 1 and 2; its description is omitted here.

FIGS. 4(a) to (l) show operating waveforms of signals appearing in the circuit of FIG. 3. These waveforms show the changes of signals in such state that the center of the light beam reflected from the disc deviates due to disturbances from the dividing line 9c of the photo detectors 9a and 9b, that is to say, in such state as indicated by a broken line of FIG. 2 and in the case where the tracking servo-loop is open and the light spot moves crossing obliquely the recording track on the disc surface. In the drawing, a charactor $t_0$ indicates the time when the light spot coincides with the center of a target track, charactors $t_{-1}$ and $t_{+1}$ respectively represent the times when the light spot coincides with the center of the inner and outer tracks adjacent to the target track, and the axis of ordinate shows the signal level.

Figure 4A:
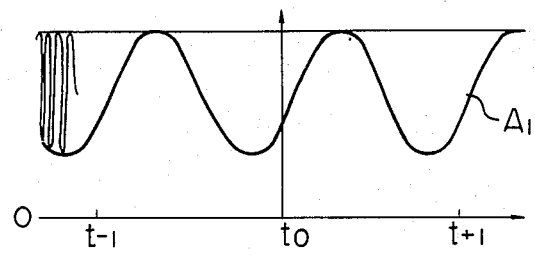
Figure 4B:
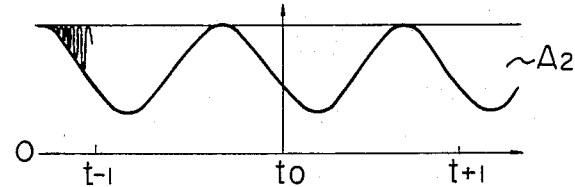

FIGS. 4(a) and (b) show amplified signals $A_1$ and $A_2$ of each detected output of a pair of photoelectric conversion elements 9a and 9b, respectively. The out put signals $A_1$ and $A_2$ respectively have signal levels proportional to the irradiated areas of the corresponding detectors 9a and 9b and the detector 9a has a larger irradiated area than the dector 9b, so that all the RF, envelope and DC components contained in the output signal $A_1$ have larger signal levels than those of output signal $A_2$. For the phase relation of the envelope components of both signals $A_1$ and $A_2$, each of them has a phase difference $\delta$ from the center of a target track as shown in FIGS. 4A and 4B. The phase difference $\pm\delta$ is caused by the fact that the strength of the reflected beams from the disc vary asymmetrically with respect to the light axis thereof on the light receiving surfaces of the photo detectors 9a and 9b in concurrence with the deviations of the light spots from the center of the target track.

Figure 4C:
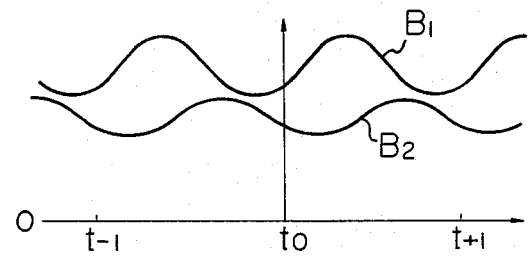
Figure 4D:
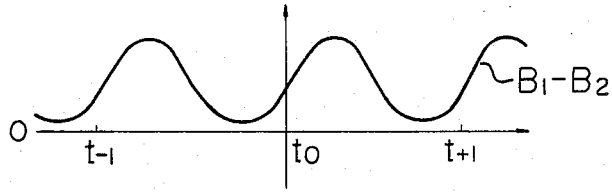

FIG. 4C shows the waveforms of signals $B_1$ and $B_2$ which one the low-frequency components extracted from signals $A_1$ and $A_2$, these waveforms are approximated by the following expressions.

$$B_1 = K_1\{e^{j(\omega t + \delta)} + L\} \tag{1}$$

$$B_2 = K_2\{e^{j(\omega t - \delta)} + L\} \tag{2}$$

wherein $K_1$ and $K_2$ are proportional constants which vary due to disturbances, L is the ratio of the DC component to AC component, $\delta$ is a phase difference described above, and $\omega$ is an angular frequency when the operating time of one track interval is set to one period. FIG. 4D shows a waveform representing a difference between both signals $B_1$ and $B_2$, which corresponds to the tracking error signal as it is shown in the prior art embodiment of FIG. 1. As seen from the drawing, presence of DC offset disables the locking of tracking servo. This DC offset component represents the influence of disturbance, this is set off by the signal described hereinafter.

Figure 4E:
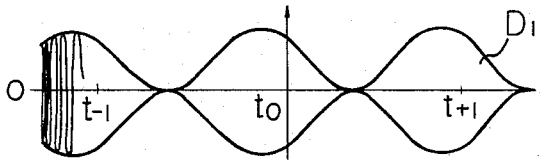
Figure 4F:
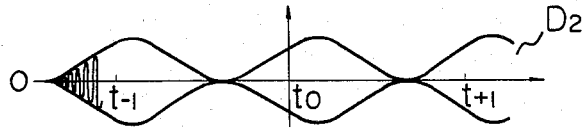
Figure 4G:
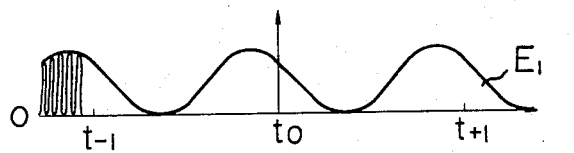
Figure 4H:
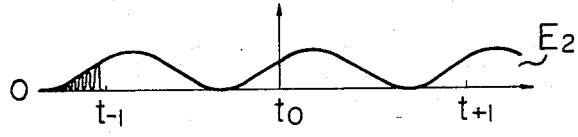
Figure 4J:
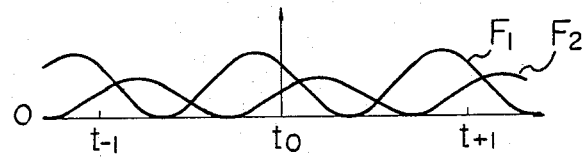
Figure 4K:
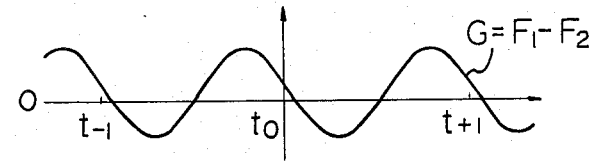

The HPFs 17a and 17b eliminates DC components of the output signals $A_1$ and $A_2$ so as to produce high frequency components (RF components), i. e. recorded information signal components $D_1$ and $D_2$ which respectively have envelope which are symmetrical with respect to the zero level as seen from FIGS. 4E and 4F. FIGS. 4G and 4H show the waveforms of signals $E_1$ and $E_2$ which are resulted from the fullwave rectification of waveforms $D_1$ and $D_2$. Those waveforms $E_1$ and $E_2$ were integrated by the LPFs 19a and 19b so as to produce envelope detection signals $F_1$ and $F_2$ having such waveforms as shown in FIG. 4J. The signals $F_1$ and $F_2$ are approximated by the following expressions.

$$F_1 = K_1\{-e^{j(\omega t + \delta)} + 1\} \tag{3}$$

$$F_2 = K_2\{-e^{j(\omega t + \delta)} + 1\} \tag{4}$$

FIG. 4(j) shows the waveform of the differential component G of signals $F_1$ and $F_2$, in which $$G = F_1 - F_2 = (-K_1 \cdot e^{j\delta} + K_2 \cdot e^{-j\delta}) \cdot e^{j\omega t} + K_1 - K_2 \tag{5}$$

Figure 4L:
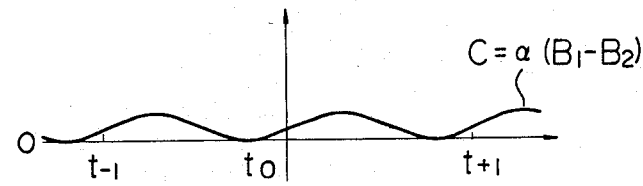

Now comparing the waveforms of FIGS. 4A–4M, it is seen that both DC offsets at the time $t_0$ has the same phase; however, the AC components are in relation of opposite phases. Consequently, it is apparent that the differential component by mixing both signals ($B_1 - B_2$) and G at an appropriate ratio permits the DC offset component to be eliminated. Therefore, the ($B_1 - B_2$) signal is multiplied by a proper gain ($\alpha$) by the differential amplifier 12 so as to obtain a signal C with such wave form as shown in FIG. 4L, the signal C of the amplifier 12 can be expressed as $$C = \alpha(B_1 - B_2) = (K_1 \cdot e^{j\delta} - K_2 \cdot e^{-j\delta}) \cdot \alpha e^{j\omega t} + (K_1 - K_2)\alpha L \tag{6}$$

Figure 4M:
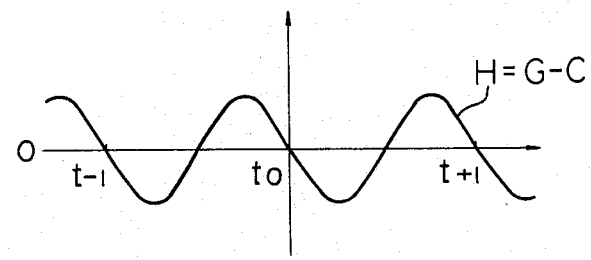

Thus, from expressions (5) and (6), if a value of $\alpha$ is selected which satisfies with the following expression $$(K_1 - K_2) = (K_1 - K_2)\alpha L \tag{7}$$

then, the differential signal of (H=G−C) can be obtained in which the DC offset was eliminated as shown in FIG. 4M. H and $\alpha$ are expressed by the following expressions $$H = (-K_1 \cdot e^{j\delta} + K_2 \cdot e^{-j\delta})(\alpha + 1) \cdot e^{j\omega t} \tag{8}$$

$$\alpha = 1/L \tag{9}$$

As clear from expressions (8), it is seen that the signal for driving coil 8 for deviating the light spot, i.e. the tracking servo signal H is the ideal tracking servo signal in which the DC offset due to disturbances has been eliminated and no deviation from the target occurs as shown in FIG. 4M.

As described above, according to the invention, by using the fact that the DC components due to external disturbances are in the same phase which are included respectively in the differences of low-frequency components and the difference in level of the high-frequency components of output signals from a pair of photo detectors, and that the AC components, which are tracking error components, are included in the opposite phase, it is possible to prevent the malfunction of the tracking servo due to disturbances by merely performing the electrical processing; this follows that there is an advantage that it is not necessary to use any optical component for this purpose.

In the above embodiment, the object lens is moved as means for deviating the light spot; however, other means such as a tracking mirror or the like may be used. The apparatus for reading information according to the invention is not limited to the apparatus for optically reading information but other system for generating the equal tracking error signal information may also be used. The recording medium is not also limited to the disc shape.

Furthermore, a pair of peak holders may be used for detecting difference in level between high frequency components contained in the output signals $A_1$ and $A_2$ from the detectors.

With this detailed description of the specific apparatus used to illustrate the preferred embodiment of the present invention, it will be obvious to those skilled in the art that various modifications can be made in the present method and apparatus described herein without departing from the spirit and scope of the invention which is limited only by the appended claims.

What is claimed is:

1. An apparatus for generating a tracking servo signal in a tracking servo control system in a recorded information reading apparatus adapted to deviate an information detecting point in the direction perpendicular to a target recording track on a recording medium in accordance with said tracking servo signal so that the information detecting point accurately traces the recording track, comprising:

detecting means for producing a pair of detection signals a difference between which represents amount and directions of deviations of said information detecting point from the track in the direction perpendicular to the track;

means for obtaining a first difference between low-frequency components of the detection signals of said detecting means;

means for obtaining a second difference between levels of high-frequency components of the detection signals of said detecting means; and means for generating said tracking servo signal by combining said first and second differences.

2. The apparatus as set forth in claim 1 wherein said information detecting point is a light spot, and wherein said detecting means comprises a pair of photoelectric conversion elements, the light receiving surface of said photoelectric conversion element being divided by a dividing line and these light receiving surfaces thus divided being independent each other, and wherein said dividing line is disposed in parallel to the tangential direction of said recording track.

* * * * *